US011507666B2

(12) United States Patent
Bursell (10) Patent No.: US 11,507,666 B2
(45) Date of Patent: Nov. 22, 2022

(54) TRUSTED EXECUTION ENVIRONMENT VERIFICATION OF A SOFTWARE PACKAGE

(71) Applicant: Red Hat, Inc., Raleigh, NC (US)

(72) Inventor: Michael H. M. Bursell, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 281 days.

(21) Appl. No.: 16/551,964

(22) Filed: Aug. 27, 2019

(65) Prior Publication Data
US 2021/0064754 A1 Mar. 4, 2021

(51) Int. Cl.
| G06F 21/57 | (2013.01) |
| G06F 8/61 | (2018.01) |
| H04L 9/00 | (2022.01) |
| H04L 9/32 | (2006.01) |

(52) U.S. Cl.
CPC .............. *G06F 21/572* (2013.01); *G06F 8/61* (2013.01); *H04L 9/006* (2013.01); *H04L 9/321* (2013.01); *H04L 9/3242* (2013.01); *H04L 9/3247* (2013.01); *G06F 2221/033* (2013.01)

(58) Field of Classification Search
CPC .... G06F 21/572; G06F 8/61; G06F 2221/033; G06F 21/57; H04L 9/006; H04L 9/321; H04L 9/3242; H04L 9/3247; H04L 9/00; H04L 9/32
See application file for complete search history.

(56) References Cited

U.S. PATENT DOCUMENTS

| 8,849,717 | B2 | 9/2014 | Cooper et al. | |
| 9,536,088 | B1* | 1/2017 | Igotti | .................... G06F 21/561 |
| 9,722,775 | B2* | 8/2017 | Hjelm | .................. H04L 9/3271 |
| 10,169,591 | B2 | 1/2019 | Campagna et al. | |
| 2010/0287547 | A1* | 11/2010 | Korkishko | .............. G06F 21/57 |
| | | | | 717/177 |
| 2014/0066015 | A1* | 3/2014 | Aissi | ................... H04L 63/0876 |
| | | | | 455/411 |

(Continued)

FOREIGN PATENT DOCUMENTS

EP    3140770 A1    3/2017

OTHER PUBLICATIONS

Author Unknown, "Citrix XenServer 7.0 Virtual Machine User's Guide," Edition 1.1, Nov. 2018, Citrix Systems, Inc., 89 pages.

(Continued)

*Primary Examiner* — Theodore C Parsons
*Assistant Examiner* — Howard H. Louie
(74) *Attorney, Agent, or Firm* — Dority & Manning, P.A.

(57) ABSTRACT

Trusted execution environment verification of a software package. An operating system (OS) initiates a software package verification process in a trusted execution environment, the OS being part of an OS environment comprising a file system. It is determined that a first software package in a software repository is to be installed into the OS environment. The first software package is downloaded to a storage device. The OS sends, to the software package verification process, first location information that identifies a location of the first software package. The OS receives, from the software package verification process, information that indicates that the first software package on the storage device is trusted.

19 Claims, 9 Drawing Sheets

(56) References Cited

U.S. PATENT DOCUMENTS

| | | | |
|---|---|---|---|
| 2014/0096182 A1* | 4/2014 | Smith | H04L 67/10 |
| | | | 726/1 |
| 2014/0130151 A1* | 5/2014 | Krishnamurthy | G06F 21/572 |
| | | | 726/22 |
| 2015/0318986 A1 | 11/2015 | Novak et al. | |
| 2016/0065376 A1* | 3/2016 | Smith | H04L 63/123 |
| | | | 713/171 |
| 2017/0357496 A1* | 12/2017 | Smith | H04L 9/3228 |

OTHER PUBLICATIONS

Bhat, Akshay, "Trusted Software Development Using OP-TEE," Security Blog, timesys.com/security/trusted-software-development-op-tee, Oct. 16, 2017, Timesys Corporation, 8 pages.

Thomsen, Sascha, "Ethereum Wallet in a Trusted Execution Environment/ Secure Enclave," medium.com/weeves-world/ethereum-wallet-in-a-trusted-execution-environment-secure-enclave-b200b4df9f5f, Jun. 27, 2018, 11 pages.

* cited by examiner

TRUSTED EXECUTION ENVIRONMENT VERIFICATION OF A SOFTWARE PACKAGE

BACKGROUND

Operating system (OS) environments continually, over time, install software packages to provide new additional functionality, upgrade existing functionality, resolve identified problems, and for other reasons. Installation of software packages can thus be a relatively frequent occurrence in an OS environment.

SUMMARY

The examples disclosed herein provide trusted execution environment (TEE) verification of a software package. A TEE is a hardware-implemented protected environment in which a process can execute free of any monitoring from the host OS. Thus, a process in a TEE, assuming that the process is not initially compromised, cannot later be compromised by a compromised OS. The examples utilize a software package verification process, executing in the TEE, to determine whether a software package is valid or not prior to installation into the OS environment. If the software package verification process determines that the software package is valid, the software package verification process notifies the OS that the software package is valid, and the OS installs the software package into the OS environment. If the software package verification process determines that the software package is not valid, the software package verification process notifies the OS that the software package is not valid, and the OS does not install the software package into the OS environment.

In one example a method is provided. The method includes initiating, by an operating system (OS) executing on a computing device including a processor device, a software package verification process in a trusted execution environment (TEE), the OS being part of an OS environment including a file system. The method further includes determining that a first software package in a software repository is to be installed into the OS environment. The method further includes downloading the first software package to a storage device. The method further includes sending, by the OS to the software package verification process, first location information that identifies a location of the first software package. The method further includes receiving, from the software package verification process, information that indicates that the first software package on the storage device is trusted.

In another example a computing device is provided. The computing device includes a memory and a processor device coupled to the memory. The processor device is to initiate, by an operating system (OS), a software package verification process in a trusted execution environment (TEE), the OS being part of an OS environment comprising a file system. The processor device is further to determine that a first software package in a software repository is to be installed into the OS environment. The processor device is further to download the first software package to a storage device. The processor device is further to send, by the OS to the software package verification process, first location information that identifies a location of the first software package. The processor device is further to receive, from the software package verification process, information that indicates that the first software package on the storage device is trusted.

In another example a computer program product is provided. The computer program product is stored on a non-transitory computer-readable storage medium and includes instructions to cause a processor device to initiate, by an operating system (OS), a software package verification process in a trusted execution environment (TEE), the OS being part of an OS environment comprising a file system. The instructions further cause the processor device to determine that a first software package in a software repository is to be installed into the OS environment. The instructions further cause the processor device to download the first software package to a storage device. The instructions further cause the processor device to send, by the OS to the software package verification process, first location information that identifies a location of the first software package. The instructions further cause the processor device to receive, from the software package verification process, information that indicates that the first software package on the storage device is trusted.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Operating system (OS) environments continually, over time, install software packages to provide new additional functionality, upgrade existing functionality, resolve identified problems, and for other reasons. Installation of software packages can thus be a relatively frequent occurrence in an OS environment. Unfortunately, each introduction of a software package into an OS environment is an opportunity for a compromised software package to implement undesired functionality into the OS environment. It is thus important to verify that a software package that is being installed, whether a new software package or an update to an existing software package, is a valid software package and not a compromised software package. However, determining the validity of a software package can be difficult, especially in the case where the OS itself has been compromised.

The examples disclosed herein provide trusted execution environment (TEE) verification of a software package. A TEE is a hardware-implemented protected environment in which a process can execute free of any monitoring from the host OS. Thus, a process in a TEE, assuming that the process is not initially compromised, cannot later be compromised by a compromised OS. The examples utilize a software package verification process, executing in the TEE, to determine whether a software package is valid or not prior to installation into the OS environment. If the software package verification process determines that the software package is valid, the software package verification process notifies the OS that the software package is valid, and the OS installs the software package into the OS environment. If the software package verification process determines that the software package is not valid, the software package verification process notifies the OS that the software package is not valid, and the OS does not install the software package into the OS environment.

Figure 1:
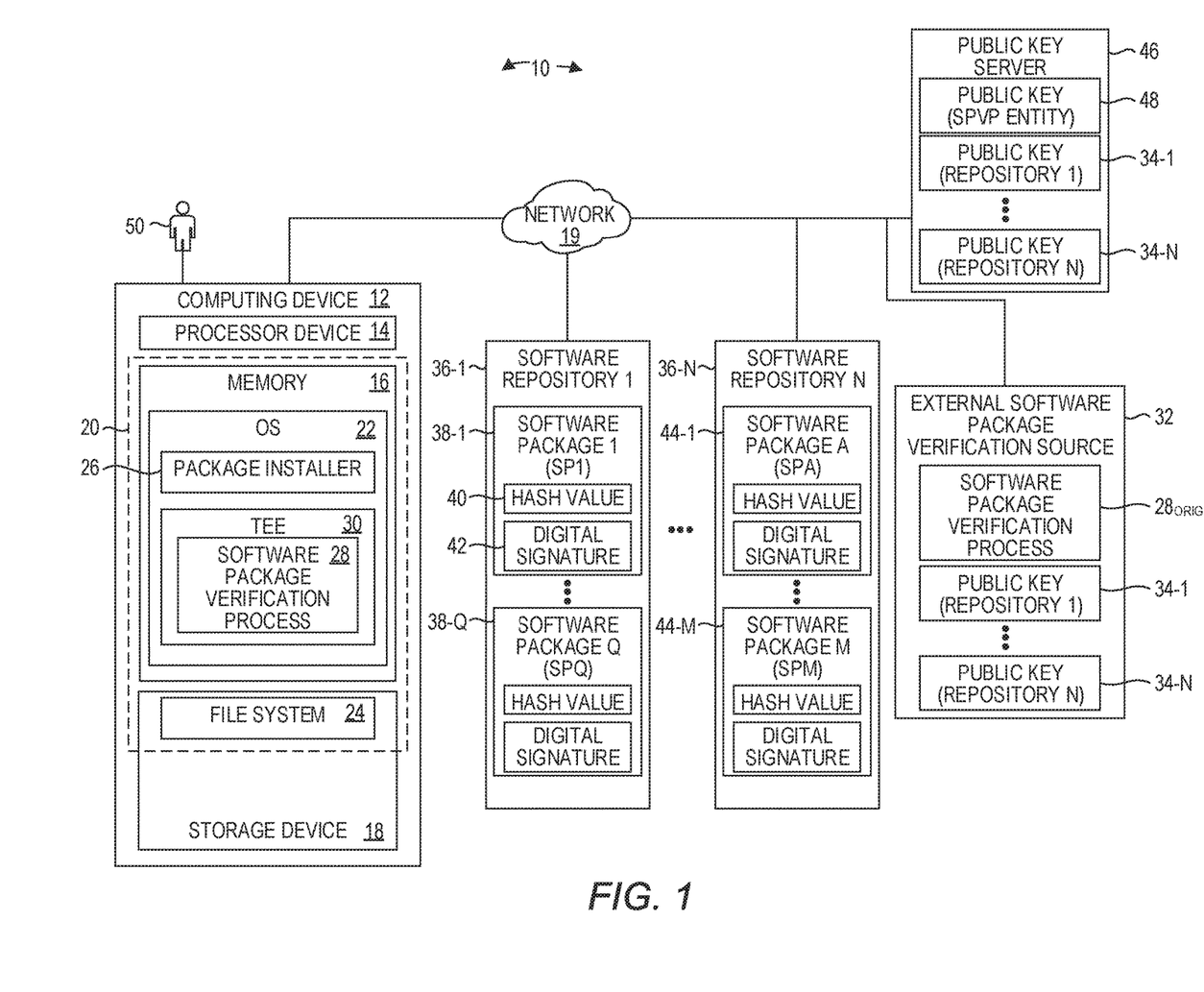
FIG. 1 is a block diagram of an environment in which examples disclosed herein may be practiced.

FIG. 1 is a block diagram of an environment 10 in which examples disclosed herein may be practiced. The environment 10 includes a computing device 12, which in turn includes a processor device 14 and a memory 16. The computing device 12 may include, or be communicatively coupled to, a storage device 18. In some examples, the computing device 12 may access the storage device 18 via a network 19. An operating system (OS) environment 20 includes an OS 22 and a file system 24. The file system 24 may be implemented, for example, on the storage device 18. The OS 22 may comprise any suitable OS, including, by way of non-limiting example, a Linux OS or a Windows® OS. The file system 24 is a file system that has been formatted for use in conjunction with the particular OS 22 and may comprise any suitable file system, such as, by way of non-limiting example, a File Allocation Table (FAT) file system or a New Technology File System (NTFS) file system. The file system 24 contains a collection of files, including, by way of non-limiting example, the executable code of the OS 22, configuration files, and may include one or more software packages that have been installed into the OS environment 20.

The OS 22 may include a package installer 26 that is responsible for installing software packages into the OS environment 20. It should be noted that because the package installer 26 is a component of the OS 22, functionality implemented by the package installer 26 may be attributed herein to the OS 22. Moreover, because the OS 22 is a component of the computing device 12, functionality implemented by the OS 22 may be attributed to the computing device 12 generally. Moreover, in examples where the OS 22 comprises software instructions that program the processor device 14 to carry out functionality discussed herein, functionality implemented by the OS 22 may be attributed herein to the processor device 14.

The OS 22 initiates a software package verification process (SPVP) 28 in a TEE 30. The TEE 30 is an environment implemented in part by the processor device 14, and processes that execute in the TEE 30, such as the SPVP 28 in this example, are protected with respect to confidentiality and cannot, by design, be queried or monitored by the host OS 22. Examples of TEEs include Intel's SGX TEE and AMD's SeV TEE. Thus, once executing in the TEE 30, the SPVP 28 cannot be subsequently compromised or corrupted by the OS 22.

The SPVP 28 may be packaged as part of the OS 22, or, may be retrieved from a trusted external source, such as a software package verification source (ESPVS) 32. The ESPVS 32 may, for example, be provided by a commercial entity, such as a manufacturer of the OS 22. The ESPVS 32 may also, in some implementations, be a source of one or more public keys 34-1-34-N of one or more software repositories 36-1-36-N. As will be discussed in greater detail below, such public keys 34-1-34-N may be used to ensure that a software package that is to be installed into the OS environment 20 has been digitally signed by a private key of a valid entity associated with the software package.

The software repository 36-1 may be any storage device or storage devices that contain software packages for installation, and may be associated with a first software manufacturer that manufactures software used in the OS environment 20. This manufacturer may be the manufacturer of the OS 22 or a different software manufacturer. The software repository 36-1 may have a plurality of software packages 38-1-38-Q that may be used by the customers of the first software manufacturer. There may be tens, hundreds, or thousands of software packages 38-1-38-Q. Some of the software packages 38-1-38-Q may be software packages that are not currently installed in an OS environment, and others of the software packages 38-1-38-Q may be update software packages that update aspects of a software package that is already installed in an OS environment.

The software package 38-1 may include a predetermined cryptographic hash value 40, such as a checksum, that is the result of processing the software package 38-1 with a hashing function. The software package 38-1 may also include a digital signature 42 generated using a private key of an entity associated with the software package 38-1, in this example, the first software manufacturer associated with the software repository 36-1.

The software repository 36-N may be associated with a second software manufacturer that also manufactures software used in the OS environment 20. The software repository 36-N may have a plurality of software packages 44-1-44-M that may be used by the customers of the second software manufacturer.

In some implementations, rather than obtaining the public keys 34-1-34-N from the ESPVS 32, the public keys 34-1-34-N may be available from a public key server 46. The public key server 46 may also include a public key 48 of the entity associated with the SPVP 28.

In one example, assume that the OS 22 determines that the software package 38-1 in the software repository 36-1 is to be installed into the OS environment 20. The phrase "installed into" in this context refers to an installation process associated with the software package 38-1 that includes copying portions of the software package 38-1 to appropriate locations of the file system 24 and modifying data sources, such as configuration files. The precise steps performed, the precise data that is copied to the file system 24, the precise locations of the file system 24 to which the data is copied, and the modifications to data sources such as configuration file(s) typically differs with each different software package 38-1-38-Q. In fact, the OS 22 may have no knowledge of how to install the software package 38-1, and the software package 38-1 may include an installation executable or script, which, when executed by the OS 22, installs the software package 38-1 into the OS environment 20. Prior to installation of the software package 38-1, the software package 38-1 will typically first be downloaded from the software repository 36-1 to some location, such as the storage device 18, and then subsequently installed into the OS environment 20 from such downloaded location.

The OS 22 may make the determination that the software package 38-1 in the software repository 36-1 is to be installed into the OS environment 20 in any suitable manner. In one example, an operator 50 may instruct the OS 22 to install the software package 38-1 into the OS environment 20. In another example, the OS 22 may periodically poll the software repository 36-1 to determine whether software packages 38-1-38-Q have been added to the software repository 36-1 that have not previously been installed into the OS environment 20. Such software packages 38-1-38-Q may be an update of an existing software package previously installed into the OS environment 20 or may be a completely new software package, a version of which had never been previously installed into the OS environment 20.

The OS 22 downloads the software package 38-1 to the storage device 18. The OS 22 then sends location information that identifies the location of the software package 38-1 on the storage device 18 to the SPVP 28. The location information may comprise, for example, a uniform resource identifier (URI) or any other suitable mechanism for identifying the location of the software package 38-1 on the storage device 18. The SPVP 28 receives the location information and, as will be discussed in greater detail below with regard to FIGS. 3-6, accesses the software package 38-1 to determine whether the software package 38-1 is valid, and is therefore trusted to be installed into the OS environment 20, or is invalid, and should not be installed into the OS environment 20. The SPVP 28 then sends information to the OS 22 that the software package 38-1 is trusted (e.g., valid), or is not trusted (e.g., invalid). If the SPVP 28 indicates that the software package 38-1 is valid, the OS 22 may then install the software package 38-1 into the OS environment 20.

Figure 2:
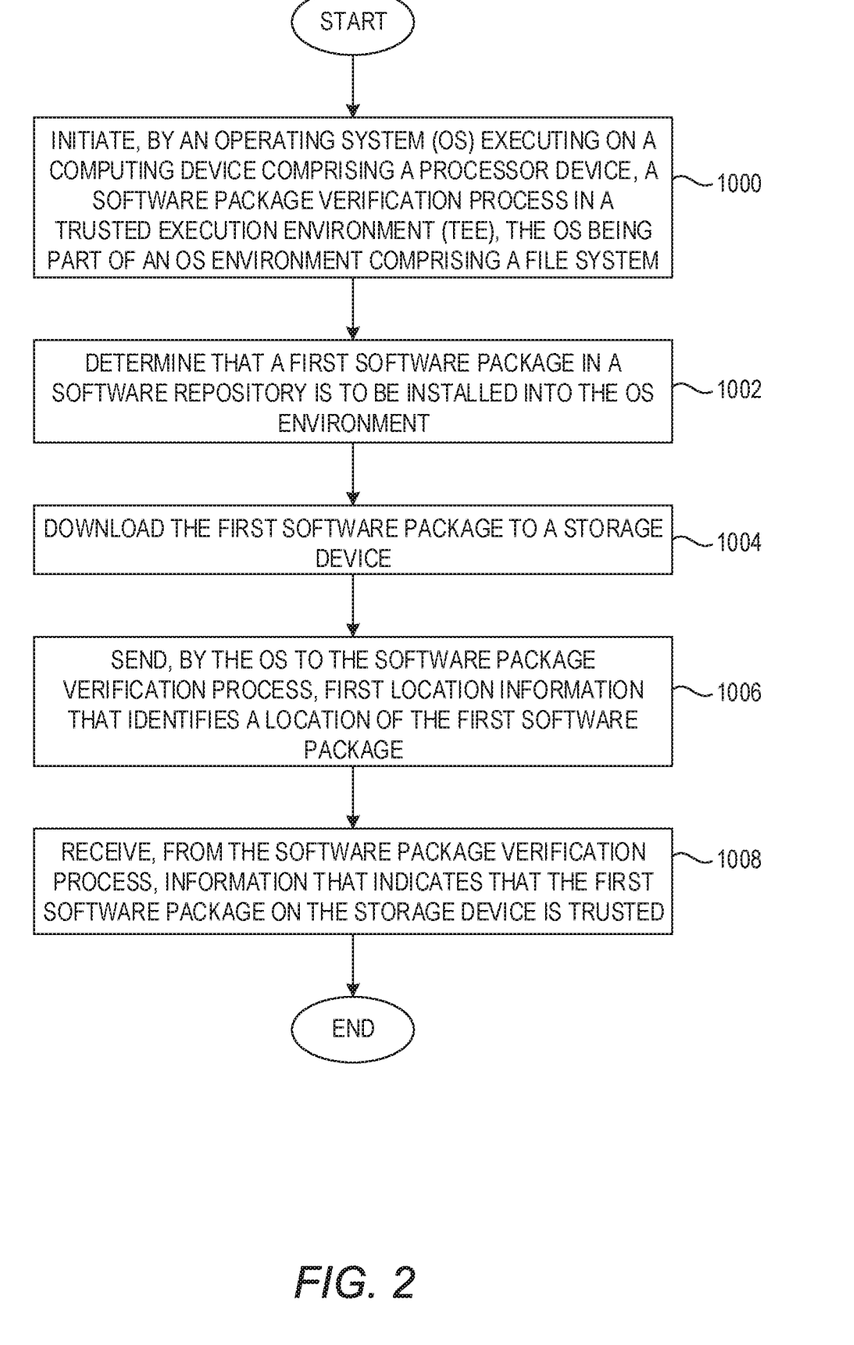
FIG. 2 is a flowchart of a method for trusted execution environment (TEE) verification of a software package according to one example.

FIG. 2 is a flowchart of a method for trusted execution environment verification of a software package according to one example. FIG. 2 will be discussed in conjunction with FIG. 1. The OS 22 initiates the SPVP 28 in the TEE 30. The OS 22 is part of the OS environment 20 that includes the file system 24 (block 1000). The OS 22 determines that the software package 38-1 in the software repository 36-1 is to be installed into the OS environment 20 (block 1002). The OS 22 downloads the software package 38-1 to the storage device 18 (block 1004). The OS 22 sends location information that identifies a location of the software package 38-1 to the SPVP 28 (block 1006). The OS 22 receives, from the SPVP 28, information that indicates that the software package 38-1 on the storage device 18 is trusted (block 1008). It will be noted that the steps discussed herein need not necessarily be performed in the order depicted in FIG. 2. In particular, as will be discussed in greater detail below, in some implementations the OS 22 may send location information that identifies the software package 38-1 on the software repository 36-1 to the SPVP 28, and the SPVP 28 may then download the software package 38-1 from the software repository 36-1 to the storage device 18.

Figure 3:
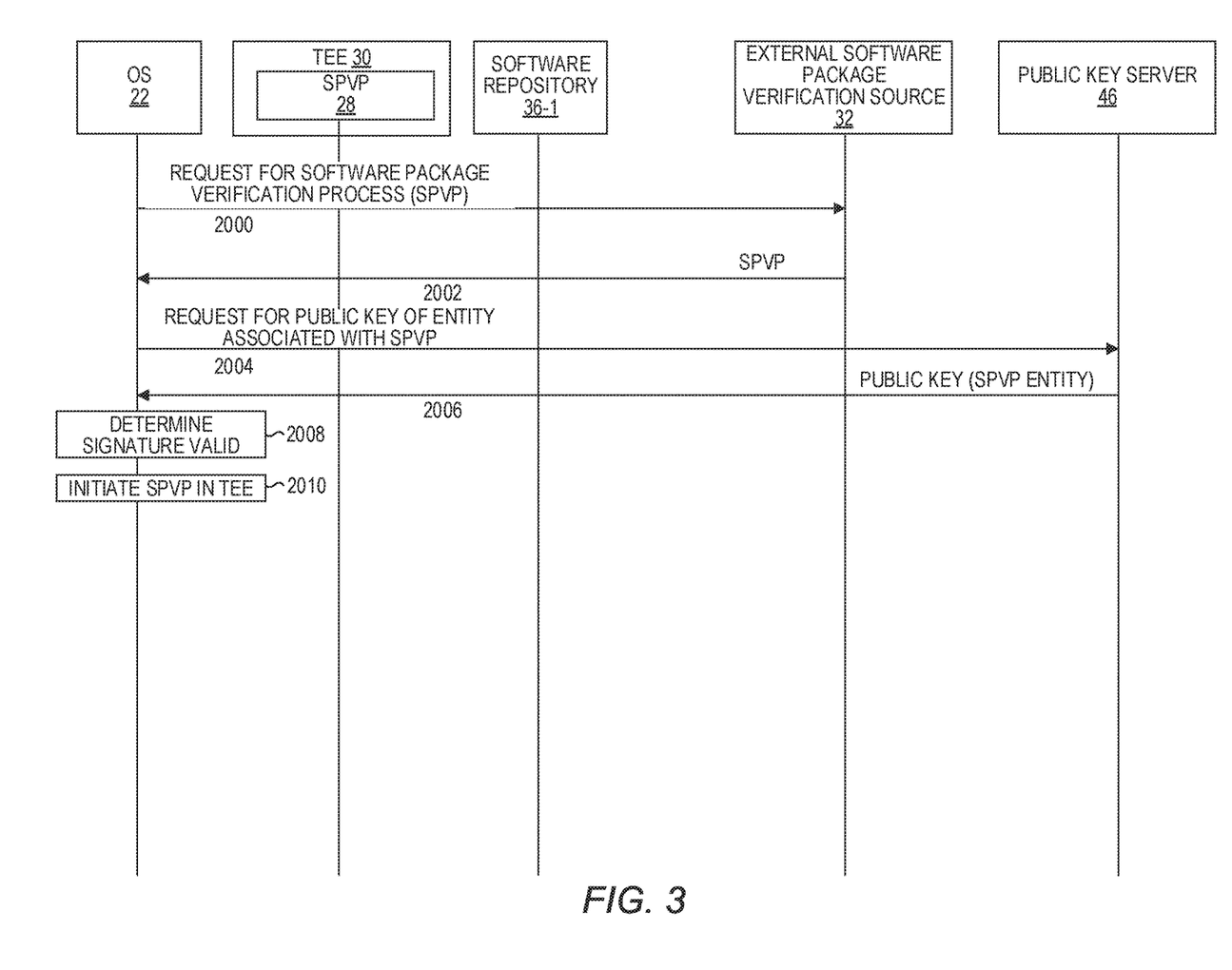
FIG. 3 is a sequence diagram illustrating a sequence of messages and actions suitable for initiating a software package verification process (SPVP) into a TEE according to one example.

FIG. 3 is a sequence diagram illustrating an example sequence of messages and actions suitable for initiating the SPVP 28 into the TEE 30 according to one example. In this example, the OS 22 determines that the SPVP 28 should be initiated in the TEE 30. This determination may be made, for example, as part of an initialization sequence or boot sequence of the OS 22, or may be made in response to a some event, such as a determination that a software package is to be installed into the OS environment 20. The OS 22 sends a request to the ESPVS 32 for the SPVP 28 (block 2000). The ESPVS 32 sends a digitally signed SPVP 28 to the OS 22 (block 2002). The OS 22 sends a request to the public key server 46 for the public key of the entity associated with the SPVP 28, in this example, the manufacturer of the OS 22 (block 2004). The public key server 46 sends the public key 48 (FIG. 1) of the manufacturer of the OS 22 to the OS 22 (block 2006). The OS 22 utilizes the public key 48 to verify that the digital signature with which the SPVP 28 was signed was in fact the digital signature of the manufacturer of the OS 22 (block 2008). The OS 22 initiates the SPVP 28 in the TEE 30 (block 2010).

Figure 4A:
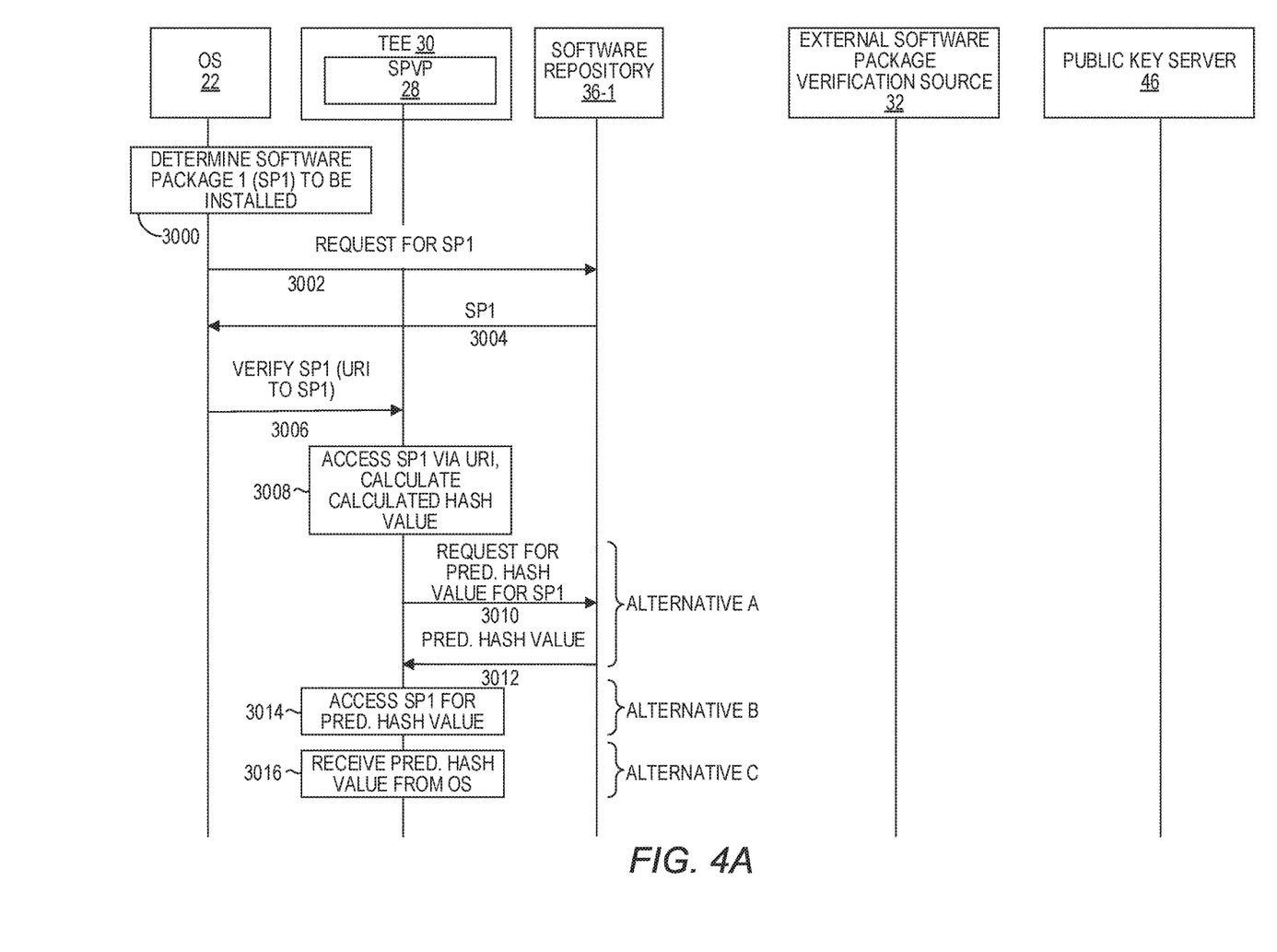
FIGS. 4A-4B illustrate a sequence diagram illustrating a sequence of messages and actions suitable for TEE verification of a software package according to some implementations.
Figure 4B:
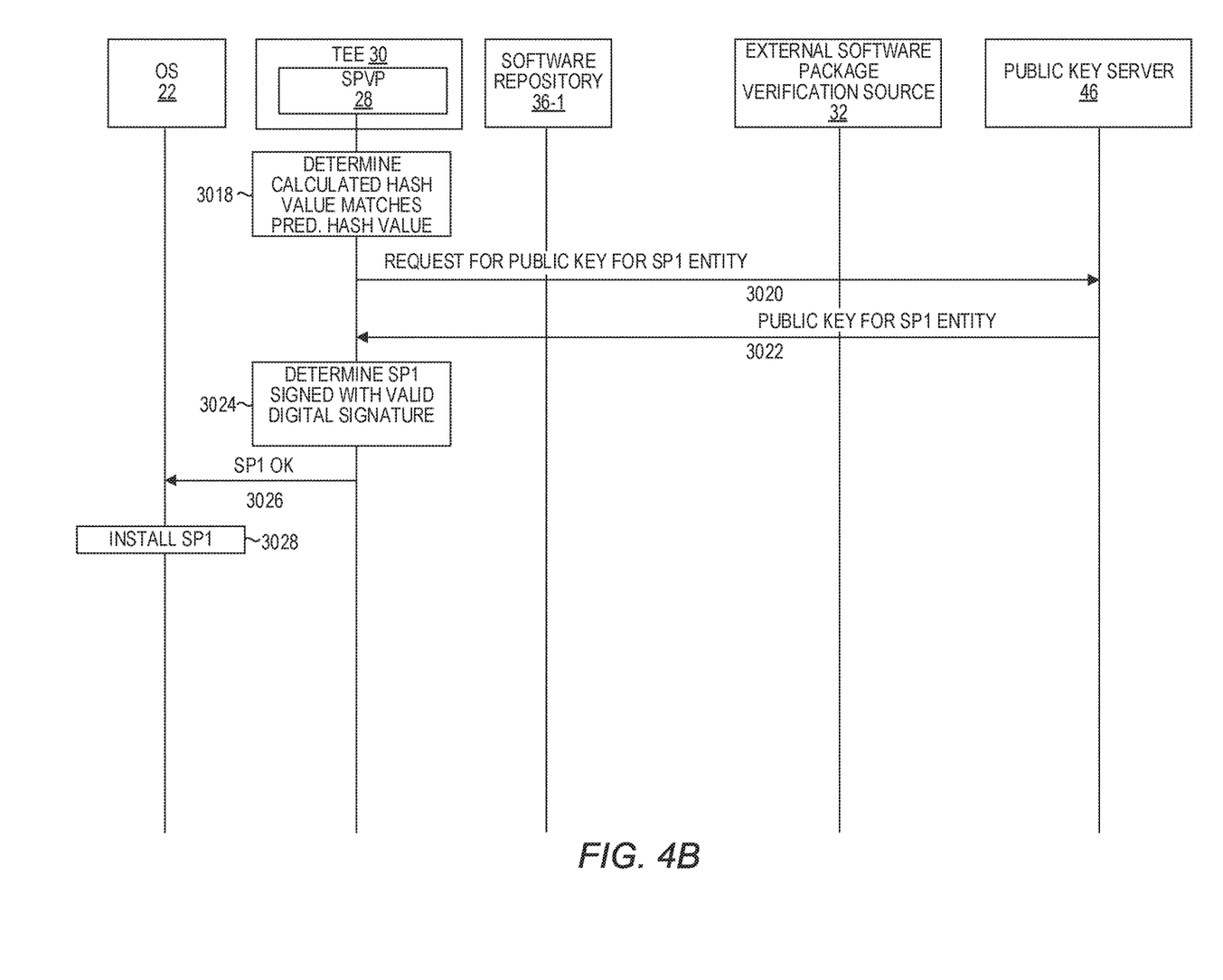

FIGS. 4A-4B are a sequence diagram illustrating an example sequence of messages and actions suitable for trusted execution environment verification of a software package according to some implementations. In this example the SPVP 28 has already been initiated in the TEE 30. The OS 22 determines that the software package 38-1 is to be installed (block 3000). The OS 22 sends, to the software repository 36-1, a request for the software package 38-1 and downloads the software package 38-1 to the storage device 18 (blocks 3002, 3004). The OS 22 sends location information, such as a URI, that identifies a location of the software package 38-1 to the SPVP 28 (block 3006). The SPVP 28, using the location information, accesses the software package 38-1, and calculates a calculated cryptographic hash value, such as a checksum, by performing a cryptographic hashing algorithm on the contents of the software package 38-1 (block 3008).

The SPVP 28 obtains a predetermined cryptographic hash value 40 associated with the software package 38-1. The predetermined cryptographic hash value 40 is a cryptographic hash value that accompanies the software package 38-1 and that was generated by performing a cryptographic hashing algorithm on the contents of the software package 38-1 by the entity associated with the software package 38-1, in this example, the first software manufacturer. If the calculated cryptographic hash value differs from the predetermined cryptographic hash value 40, then the software package 38-1 accessed by the SPVP 28 differs from the software package 38-1 on the software repository 36-1, and is invalid, or, not to be trusted.

The SPVP 28 may obtain the predetermined cryptographic hash value 40 in any of a number of different ways. In a first alternative manner, the SPVP 28 sends a request to the software repository 36-1 for the predetermined cryptographic hash value 40 associated with the software package 38-1 (block 3010). In response, the software repository 36-1 sends the predetermined cryptographic hash value 40 associated with the software package 38-1 to the SPVP 28 (block 3012). In a second alternative manner, the SPVP 28 accesses the predetermined cryptographic hash value 40 that was downloaded by the OS 22 in conjunction with the software package 38-1 (block 3014). In a third alternative manner, the SPVP 28 received the predetermined cryptographic hash value 40 from the OS 22 in conjunction with the location information that identifies the location of the software package 38-1 (block 3016).

The SPVP 28 determines that the calculated cryptographic hash value and the predetermined cryptographic hash value 40 match (block 3018). In some implementations, the SPVP 28 may also determine whether the digital signature with which the software package 38-1 was signed is valid. The SPVP 28 may send a request to the public key server 46, or, in other examples, the ESPVS 32, requesting the public key 48 of the first software manufacturer associated with the software package 38-1 (block 3020). The public key server 46 sends the public key 48 of the first software manufacturer to the SPVP 28 (block 3022). In this example, the SPVP 28 determines that the software package 38-1 was signed with the digital signature of the first software manufacturer (block 3024). The SPVP 28 sends information to the OS 22 that the software package 38-1 is trusted, or valid (block 3026). In response, the OS 22 installs the software package 38-1 into the OS environment 20 (block 3028).

Figure 5:
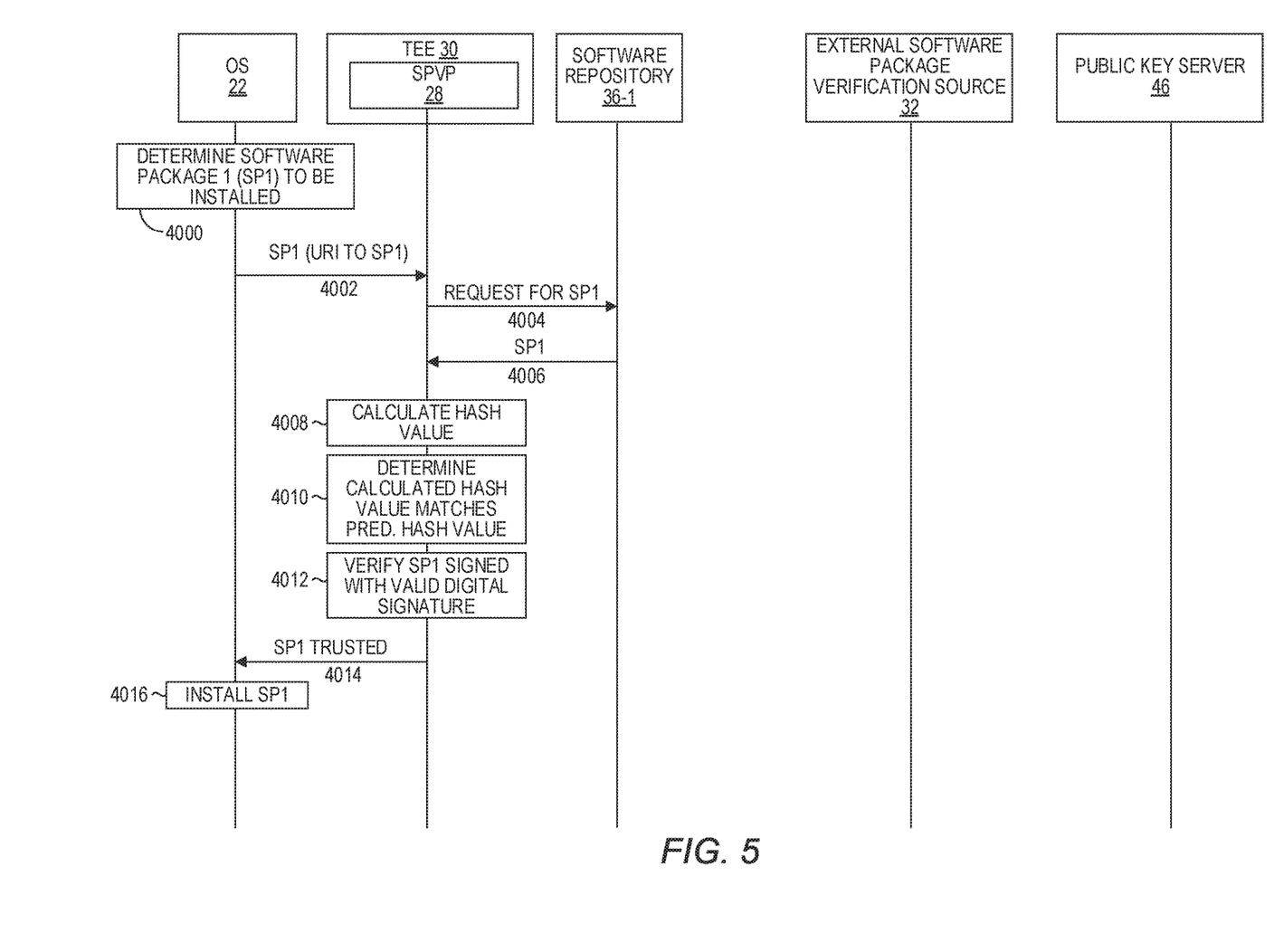
FIG. 5 is a sequence diagram illustrating a sequence of messages and actions suitable for TEE verification of a software package according to another implementation.

FIG. 5 is a sequence diagram illustrating a sequence of messages and actions suitable for trusted execution environment verification of a software package according to another implementation. In this example, the OS 22 determines that the software package 38-1 is to be installed into the OS environment 20 (block 4000). The OS 22 sends the SPVP 28 location information that identifies the location of the software package 38-1 as the software repository 36-1 (block 4002). The SPVP 28 then downloads the software package 38-1 from the software repository 36-1 to the storage device 18 by sending a request to the software repository 36-1 for the software package 38-1 (blocks 4004, 4006). The SPVP 28 calculates a calculated cryptographic hash value based on the contents of the downloaded software package 38-1 (block 4008). The SPVP 28 determines that the calculated cryptographic hash value matches the predetermined cryptographic hash value 40 that accompanied the software package 38-1 (block 4010). The SPVP 28 also determines that the digital signature with which the software package 38-1 was signed was in fact the digital signature of the first software manufacturer associated with the software package 38-1 (block 4012). The SPVP 28 sends information to the OS 22 that the software package 38-1 is trusted (block 4014). The OS 22 then installs the software package 38-1 into the OS environment 20 (block 4016).

Figure 6:
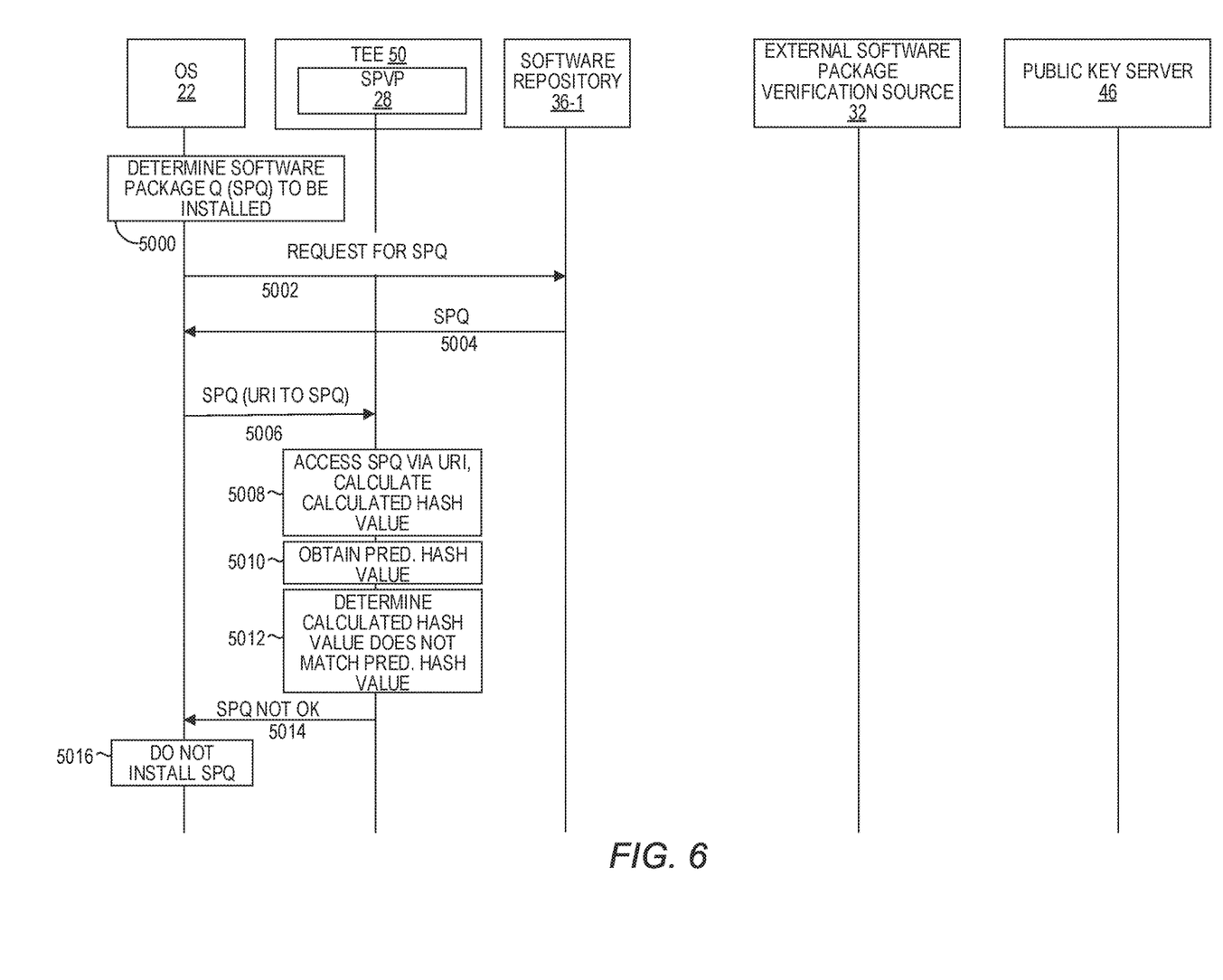
FIG. 6 is a sequence diagram illustrating a sequence of messages and actions wherein the SPVP determines that a software package should not be installed into an OS environment according to one implementation.

FIG. 6 is a sequence diagram illustrating a sequence of messages and actions wherein the SPVP 28 determines that a software package should not be installed into the OS environment 20 according to one implementation. The OS 22 determines that the software package 38-Q is to be installed into the OS environment 20 (block 5000). The OS 22 sends, to the software repository 36-1, a request for the software package 38-Q and downloads the software package 38-Q to the storage device 18 (blocks 5002, 5004). The OS 22 sends location information, such as a URI, that identifies a location of the software package 38-Q to the SPVP 28 (block 5006). The SPVP 28, using the location information, accesses the software package 38-Q, and calculates a calculated cryptographic hash value by performing a cryptographic hashing algorithm on the contents of the software package 38-Q (block 5008).

The SPVP 28 obtains a predetermined cryptographic hash value associated with the software package 38-Q (block 5010). In this example, the predetermined cryptographic hash value and the calculated cryptographic hash value do not match, resulting in a determination by the SPVP 28 that the software package 38-Q is invalid, or untrustworthy (block 5012). The SPVP 28 sends information to the OS 22 that indicates that the software package 38-Q is not to be trusted (block 5014). In response to the information, the OS 22 does not install the software package 38-Q into the OS environment 20 (block 5016). The OS 22 may, in some implementations, send an alert or other message to the operator 50 that indicates that the software package 38-Q failed a verification check and is not being installed into the OS environment 20.

Figure 7:
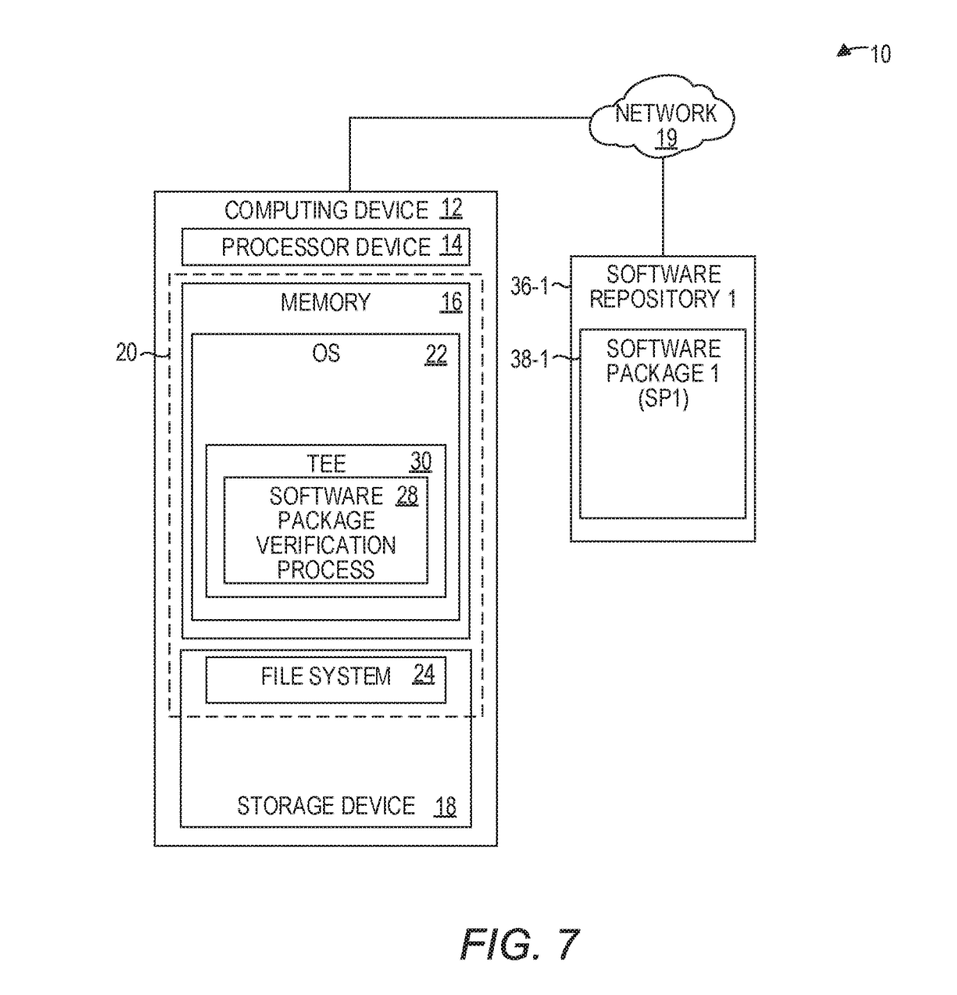
FIG. 7 is a simplified block diagram of the environment illustrated in FIG. 1.

FIG. 7 is a simplified block diagram of the environment 10 illustrated in FIG. 1. The computing device 12 includes the memory 16 and the processor device 14 coupled to the memory 16. The processor device 14 is to initiate, by the OS 22, the SPVP 28 in the TEE 30, the OS 22 being part of the OS environment 20. The processor device 14 is to determine that the software package 38-1 in the software repository 36-1 is to be installed into the OS environment 20. The processor device 14 is to download the software package 38-1 to the storage device 18. The processor device 14 is to send, by the OS 22 to the SPVP 28, location information that identifies a location of the software package 38-1. The processor device 14 is to receive, from the SPVP 28, information that indicates that the software package 38-1 on the storage device 18 is trusted.

Figure 8:
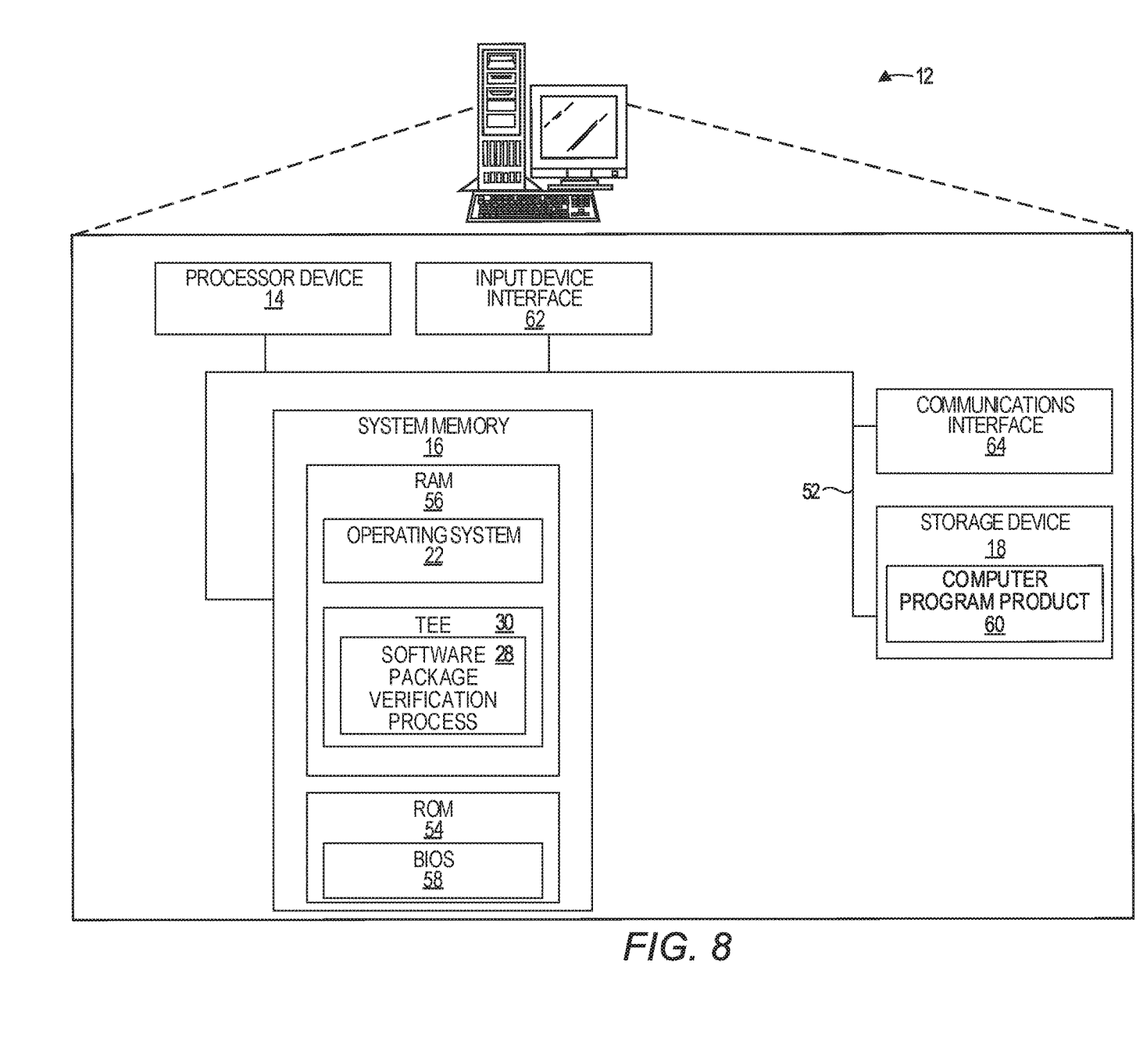
FIG. 8 is a block diagram of a computing device suitable for implementing examples according to one example.

FIG. 8 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 12 includes the processor device 14, the system memory 16, and a system bus 52. The system bus 52 provides an interface for system components including, but not limited to, the system memory 16 and the processor device 14. The processor device 14 can be any commercially available or proprietary processor.

The system bus 52 may be any of several types of bus structures that may further interconnect to a memory bus (with or without a memory controller), a peripheral bus, and/or a local bus using any of a variety of commercially available bus architectures. The system memory 16 may include non-volatile memory 54 (e.g., read-only memory (ROM), erasable programmable read-only memory (EPROM), electrically erasable programmable read-only memory (EEPROM), etc.), and volatile memory 56 (e.g., random-access memory (RAM)). A basic input/output system (BIOS) 58 may be stored in the non-volatile memory 54 and can include the basic routines that help to transfer information between elements within the computing device 12. The volatile memory 56 may also include a high-speed RAM, such as static RAM, for caching data.

The computing device 12 may further include or be coupled to a non-transitory computer-readable storage medium such as the storage device 18, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 18 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 18 and in the volatile memory 56, including the OS 22 and one or more program modules, such as the OS 22, the TEE 30 which is implemented in part by the memory 16 and the processor device 14, and the SPVP 28 in the TEE 30. It is to be appreciated that the examples can be implemented with various commercially available OSs 22 or combinations of OSs 22.

A number of modules can be stored in the storage device 18 and in the volatile memory 56, including, by way of non-limiting example, the OS 22. All or a portion of the examples may be implemented as a computer program product 60 stored on a transitory or non-transitory computer-usable or computer-readable storage medium, such as the storage device 18, which includes complex programming instructions, such as complex computer-readable program code, to cause the processor device 14 to carry out the steps described herein. The processor device 14, in conjunction with the OS 22 in the volatile memory 56, may serve as a controller, or control system, for the computing device 12 that is to implement the functionality described herein.

The operator 50 may be able to enter commands through a keyboard, a pointing device such as a mouse (not illustrated), or a touch-sensitive surface such as a display device. Such input devices may be connected to the processor device 14 through an input device interface 62 that is coupled to the system bus 52 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 64 suitable for communicating with the network 19 as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    initiating, by an operating system (OS) executing on a computing device comprising a processor device, a software package verification process in a trusted execution environment (TEE), the OS being part of an OS environment comprising a file system;
    determining, by a package installer executing outside of the TEE on the computing device, that a first software package in a software repository is to be installed into the OS environment, wherein the package installer is a component of the OS;
    downloading the first software package to a storage device;
    sending, by the OS to the software package verification process, first location information that identifies a location of the first software package;
    receiving, by the OS outside of the TEE, from the software package verification process, information that indicates that the first software package on the storage device is trusted, wherein the information that indicates that the first software package on the storage device is trusted is based on a comparison of a calculated cryptographic hash value provided by the software package verification process based on contents of the first software package to a predetermined cryptographic hash value; and
    in response to the information that indicates that the first software package on the storage device is trusted, installing, by the package installer, the first software package into the OS environment.

2. The method of claim 1 further comprising prior to initiating the software package verification process in the TEE, downloading, by the OS via a network, the software package verification process from a software package verification source.

3. The method of claim 2 wherein the software package verification process includes a digital signature, and further comprising:
    obtaining, from a public key repository, a public key of an entity associated with the software package verification process; and
    verifying, using the public key, that the digital signature was signed by the entity associated with the software package verification process.

4. The method of claim 1 wherein determining that the first software package in the software repository is to be installed into the OS environment comprises receiving user input requesting that the first software package be installed into the OS environment.

5. The method of claim 1 further comprising:
    determining that the calculated cryptographic hash value and the predetermined cryptographic hash value match; and
    in response to determining that the calculated cryptographic hash value and the predetermined cryptographic hash value match, sending, to the OS, the information that indicates that the first software package on the storage device is trusted.

6. The method of claim 5 further comprising receiving, by the software package verification process, the calculated cryptographic hash value from the OS.

7. The method of claim 5 further comprising:
    accessing, by the software package verification process, the first software package on the storage device; and
    calculating, by the software package verification process, the calculated cryptographic hash value based on the contents of the first software package.

8. The method of claim 5 further comprising obtaining, by the software package verification process, the predetermined cryptographic hash value from the software repository.

9. The method of claim 5 further comprising obtaining, by the software package verification process, the predetermined cryptographic hash value from the first software package.

10. The method of claim 5 wherein the first software package includes a digital signature, and further comprising:

obtaining, by the software package verification process, a public key of an entity associated with the first software package;

verifying, using the public key, that the digital signature was signed by the entity associated with the first software package; and wherein in response to determining that the calculated cryptographic hash value and the predetermined cryptographic hash value match, sending, to the OS, the information that indicates that the first software package on the storage device is trusted further comprises:

in response to determining that the calculated cryptographic hash value and the predetermined cryptographic hash value match, and in response to verifying, using the public key, that the digital signature was signed by the entity associated with the first software package, sending, to the OS, the information that indicates that the first software package on the storage device is trusted.

11. The method of claim 1 wherein sending, by the OS to the software package verification process, the first location information that identifies the location of the first software package comprises sending, by the OS to the software package verification process, the first location information that identifies the location of the first software package to be the software repository; and wherein downloading the first software package to the storage device comprises downloading, by the software package verification process from the software repository, the first software package to the storage device.

12. The method of claim 1 further comprising:

determining that a second software package in the software repository is to be installed into the OS environment;

downloading the second software package to the storage device;

sending, by the OS to the software package verification process, second location information that identifies a location of the second software package;

receiving, from the software package verification process, information that indicates that the second software package on the storage device is not to be trusted; and in response to the information that indicates that the second software package on the storage device is not to be trusted, not installing the second software package into the OS environment.

13. A computing device, comprising:

a memory; and a processor device coupled to the memory to:

initiate, by an operating system (OS), a software package verification process in a trusted execution environment (TEE), the OS being part of an OS environment comprising a file system;

determine, by a package installer executing outside of the TEE on the computing device, that a first software package in a software repository is to be installed into the OS environment, wherein the package installer is a component of the OS;

download the first software package to a storage device;

send, by the OS to the software package verification process, first location information that identifies a location of the first software package;

receive, by the OS outside of the TEE, from the software package verification process, information that indicates that the first software package on the storage device is trusted, wherein the information that indicates that the first software package on the storage device is trusted is based on a comparison of a calculated cryptographic hash value provided by the software package verification process based on contents of the first software package to a predetermined cryptographic hash value; and in response to the information that indicates that the first software package on the storage device is trusted, install, by the package installer, the first software package into the OS environment.

14. The computing device of claim 13 wherein the processor device is further to, prior to initiating the software package verification process in the TEE, download, by the OS via a network, the software package verification process from a software package verification source.

15. The computing device of claim 13 wherein the processor device is further to:

determine that the calculated cryptographic hash value and the predetermined cryptographic hash value match; and in response to determining that the calculated cryptographic hash value and the predetermined cryptographic hash value match, send, to the OS, the information that indicates that the first software package on the storage device is trusted.

16. A computer program product stored on a non-transitory computer-readable storage medium and including instructions to cause a processor device to:

initiate, by an operating system (OS), a software package verification process in a trusted execution environment (TEE), the OS being part of an OS environment comprising a file system;

determine, by a package installer executing outside of the TEE on the computing device, that a first software package in a software repository is to be installed into the OS environment, wherein the package installer is a component of the OS;

download the first software package to a storage device;

send, by the OS to the software package verification process, first location information that identifies a location of the first software package;

receive, by the OS outside of the TEE, from the software package verification process, information that indicates that the first software package on the storage device is trusted, wherein the information that indicates that the first software package on the storage device is trusted is based on a comparison of a calculated cryptographic hash value provided by the software package verification process based on contents of the first software package to a predetermined cryptographic hash value; and in response to the information that indicates that the first software package on the storage device is trusted, install, by the package installer, the first software package into the OS environment.

17. The computer program product of claim 16 wherein the instructions further cause the processor device to, prior to initiating the software package verification process in the TEE, download, by the OS via a network, the software package verification process from a software package verification source.

18. The method of claim 3, further comprising:

downloading the predetermined cryptographic hash value from a first server different than a second server associated with the public key repository.

19. The method of claim 3, further comprising:
downloading the software package verification process and the public key from a single server.

* * * * *